United States Patent
Han et al.

(10) Patent No.: US 10,254,463 B2
(45) Date of Patent: Apr. 9, 2019

(54) LIQUID CRYSTAL DISPLAY DEVICE COMPRISING A LIGHT GUIDE PLATE HAVING A FIRST PRISM PATTERN ON A LOWER SURFACE AND A SECOND PRISM PATTERN ON AN UPPER SURFACE

(71) Applicant: LG DISPLAY CO., LTD., Seoul (KR)

(72) Inventors: Jae-Jung Han, Seoul (KR); Eun-Hee Choi, Siheung-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/847,379

(22) Filed: Dec. 19, 2017

(65) Prior Publication Data

US 2018/0172895 A1  Jun. 21, 2018

(30) Foreign Application Priority Data

Dec. 20, 2016  (KR) .................. 10-2016-0174437

(51) Int. Cl.
*F21V 8/00* (2006.01)
*G02F 1/1335* (2006.01)

(52) U.S. Cl.
CPC ......... *G02B 6/0036* (2013.01); *G02B 6/0055* (2013.01); *G02B 6/0063* (2013.01); *G02B 6/0068* (2013.01); *G02F 1/133615* (2013.01)

(58) Field of Classification Search
CPC ............ G02F 1/133615; G02B 6/0011; G02B 6/0013; G02B 6/0015; G02B 6/0016; G02B 6/0018; G02B 6/002; G02B 6/0023; G02B 6/0025; G02B 6/0026; G02B 6/003
See application file for complete search history.

(56) References Cited

U.S. PATENT DOCUMENTS

| 5,704,703 A * | 1/1998 | Yamada ................. G01D 11/28 349/65 |
| 6,454,452 B1 * | 9/2002 | Sasagawa ............ G02B 6/0061 349/65 |
| 8,199,279 B2 * | 6/2012 | Choi .................... G02B 6/0038 349/62 |
| 2008/0112187 A1 * | 5/2008 | Katsumata .......... G02B 6/0068 362/611 |
| 2010/0014022 A1 * | 1/2010 | Nagata ................. G02B 6/0025 349/62 |
| 2010/0085509 A1 * | 4/2010 | Seo ..................... G02B 6/0036 349/65 |

(Continued)

FOREIGN PATENT DOCUMENTS

| KR | 1020090031884 A | 3/2009 |
| KR | 10-2012-0052698 A | 5/2012 |

*Primary Examiner* — Paul C Lee
(74) *Attorney, Agent, or Firm* — Seed IP Law Group LLP

(57) ABSTRACT

A liquid crystal display device includes: a liquid crystal display panel; a light guide plate having adjacent first and second light incidence surfaces below the liquid crystal display panel; a reflection plate disposed under the light guide plate; and first and second light-emitting diodes (LEDs) facing the first and second light incidence surfaces, respectively, wherein the light guide plate comprises: a first prism pattern configured on a lower surface of the light guide plate and extending in a first direction parallel to the first light incidence surface; and a second prism pattern configured on an upper surface of the light guide plate and extending in a second direction parallel to the second light incidence surface.

13 Claims, 7 Drawing Sheets

(56) References Cited

U.S. PATENT DOCUMENTS

| | | | |
|---|---|---|---|
| 2011/0228387 A1* | 9/2011 | Shiau | G02B 5/045 359/463 |
| 2012/0113680 A1* | 5/2012 | Nakai | G02B 6/0053 362/611 |
| 2014/0049723 A1 | 2/2014 | Ryu et al. | |
| 2017/0153383 A1 | 6/2017 | Lee et al. | |

* cited by examiner

LIQUID CRYSTAL DISPLAY DEVICE COMPRISING A LIGHT GUIDE PLATE HAVING A FIRST PRISM PATTERN ON A LOWER SURFACE AND A SECOND PRISM PATTERN ON AN UPPER SURFACE

CROSS-REFERENCE TO RELATED APPLICATIONS

The present application claims the priority benefit of Korean Patent Application No. 10-2016-0174437, filed on Dec. 20, 2016, in the Korean Intellectual Property Office, which hereby is incorporated by reference in its entirety for all purposes as if fully set forth herein.

BACKGROUND

Technical Field

The present disclosure relates to a liquid crystal display device (LCD), and more particularly, to an LCD capable of effectively realizing viewing angle control without increasing cost and reducing backlight characteristics.

Description of the Related Art

As an information society develops, the demand for display devices for displaying images has been increasing in various forms. Recently, various flat display devices such as liquid crystal display devices (LCDs), plasma display panels (PDPs) and organic light emitting diode (OLED) devices have been utilized.

Among these flat panel display devices, the LCD having advantages of miniaturization, weight reduction, thinness, and low power driving are being widely used.

The LCD includes a liquid crystal display panel and a backlight unit positioned below the liquid crystal display panel to supply backlight to the liquid crystal display panel.

Generally, the backlight unit does not have a viewing angle control function. On the other hand, recently, there has been an increasing demand for a privacy protection function of a display device. To meet this demand, a viewing angle control component such as a liquid crystal display panel may be added to a backlight unit so that an LCD is implemented with a narrow viewing angle mode and a wide viewing angle mode.

However, when a separate viewing angle control component is formed in the backlight unit, various problems occur such that transmittance, brightness, and image quality are lowered, power consumption is increased, and component cost is increased.

BRIEF SUMMARY

Accordingly, the present invention is directed to a liquid crystal display device including the same that substantially obviate one or more of the problems due to limitations and disadvantages of the related art.

An advantage of the present invention is to provide a liquid crystal display device that can improve viewing angle control without increasing cost and reducing backlight characteristics.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described herein, a liquid crystal display device includes: a liquid crystal display panel; a reflection plate; a light guide plate between the liquid crystal display panel and the reflection plate, the light guide plate having adjacent first and second light incidence surfaces; and first and second light-emitting diodes (LEDs) facing the first and second light incidence surfaces, respectively, wherein the light guide plate comprises: a first prism pattern on a lower surface of the light guide plate and extending in a first direction parallel to the first light incidence surface; and a second prism pattern on an upper surface of the light guide plate and extending in a second direction parallel to the second light incidence surface.

BRIEF DESCRIPTION OF THE SEVERAL VIEWS OF THE DRAWINGS

The accompanying drawings, which are included to provide a further understanding of the disclosure, are incorporated in and constitute a part of this specification, illustrate implementations of the disclosure, and, together with the description, serve to explain the principles of embodiments of the disclosure.

DETAILED DESCRIPTION

Figure 1:
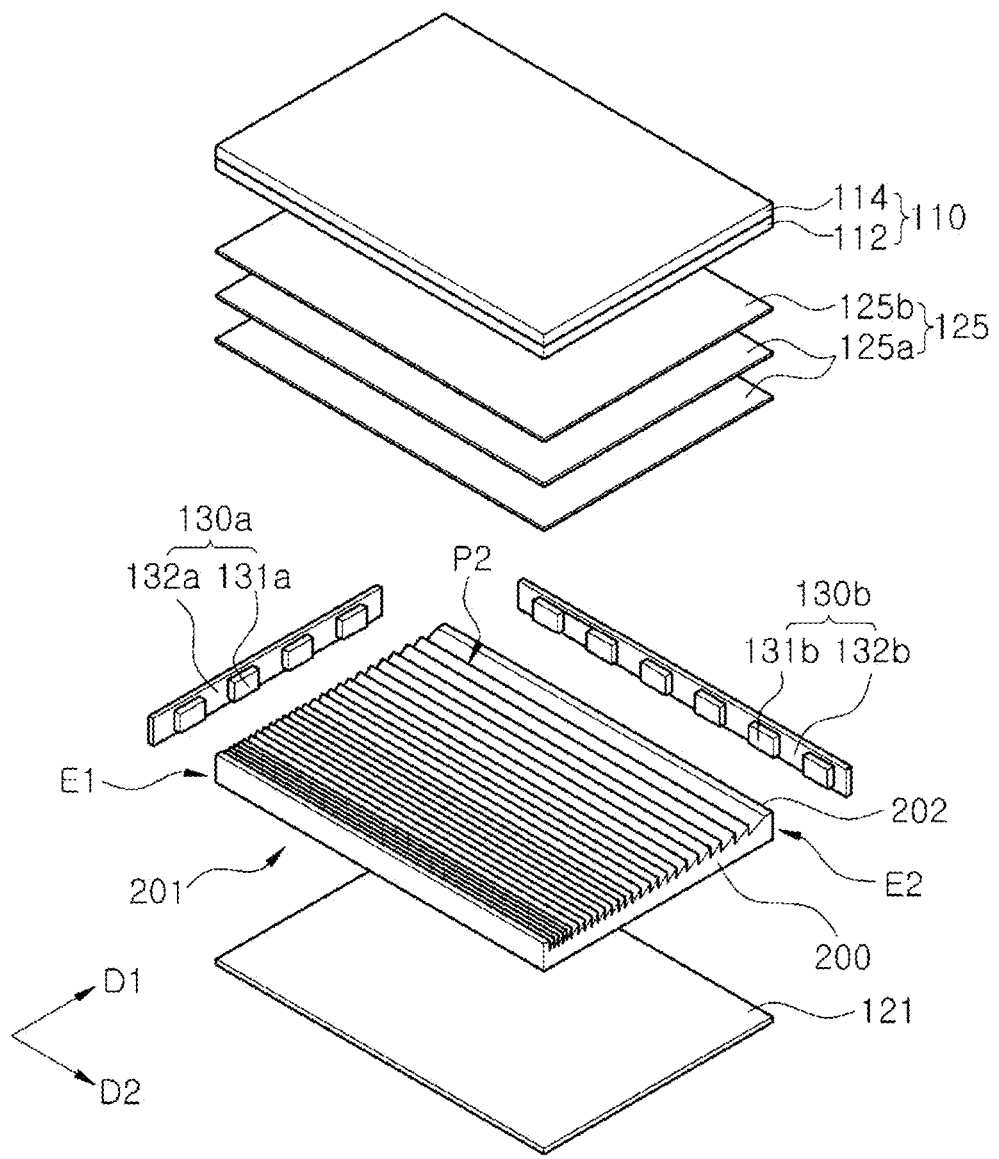
FIG. 1 is an exploded perspective view schematically illustrating a liquid crystal display device (LCD) according to an embodiment of the present disclosure.

Reference will now be made in detail to embodiments of the present disclosure, examples of which are illustrated in the accompanying drawings. In the following description, when a detailed description of well-known functions or configurations related to this document is determined to unnecessarily obscure the gist of an embodiment of the disclosure, the detailed description will be omitted. The progression of processing steps and/or operations described is an example, and the sequence of steps and/or operations is not limited to that set forth herein and may be changed as is known in the art, with the exception of steps and/or operations necessarily occurring in a certain order. Like reference numerals designate like elements throughout. Names of respective elements used in the following explanations are selected only for convenience of writing the specification, and thus may be different from those used in actual products.

Hereinafter, embodiments of the present disclosure will be described with reference to the drawings.

Figure 2:
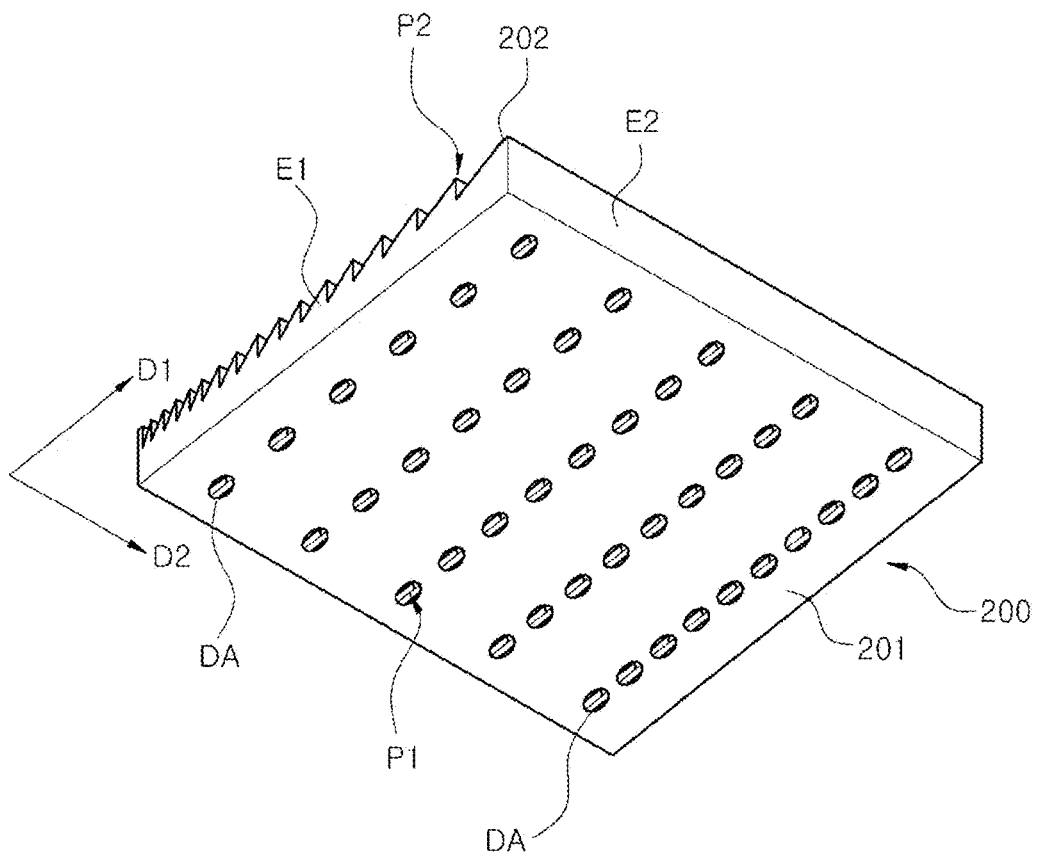
FIG. 2 is a perspective view schematically illustrating a lower surface of a light guide plate according to an embodiment of the present disclosure.

FIG. 1 is an exploded perspective view schematically illustrating a liquid crystal display device (LCD) according to an embodiment of the present disclosure. FIG. 2 is a perspective view schematically illustrating a lower surface of a light guide plate according to an embodiment of the present disclosure.

Referring to FIG. 1, an LCD 100 according to an embodiment of the present disclosure may include a liquid crystal display panel 110 and a backlight unit 120 disposed under the liquid crystal display panel 110.

Meanwhile, although not specifically illustrated, the LCD 100 may include, for example, a guide panel, a top case, and a bottom cover as a mechanism for combining the liquid crystal display panel 110 and the backlight unit 120 for modularization.

The guide panel may have a rectangular frame shape surrounding side surfaces of the liquid crystal display panel 110 and the backlight unit 120. The liquid crystal display panel 110 may be mounted on the guide panel. At this time, the liquid crystal display panel 110 may be attached to an upper surface of the guide panel via an adhesive member such as a double-sided adhesive tape.

The bottom cover may protect and support a back surface of the backlight unit 120 surrounded by the guide panel. The bottom cover may be configured to include a plate-shaped base portion on which the backlight unit 120 is seated, and a sidewall portion that is vertically bent upward from an edge of the base portion. The backlight unit 120 may be accommodated in an internal accommodating space defined by the base portion and the sidewall portion.

The top case may have a rectangular frame shape covering an edge of the liquid crystal display panel 110.

The liquid crystal display panel 110 and the backlight unit 120 may be modularized through the guide panel, the bottom cover, and the top case.

The liquid crystal display panel 110 includes first and second substrates 112 and 114 bonded to face each other, and a liquid crystal layer (not shown) interposed between the first and second substrates 112 and 114 to display an image.

Although not illustrated in detail, on an inner surface of the first substrate 112, which is called a lower substrate or an array substrate, a plurality of gate lines and data lines cross each other to define pixels, and a thin film transistor connected to a gate line and a data line corresponding to each of the pixels, and a pixel electrode connected to the thin film transistor may be formed.

Moreover, on an inner surface of the second substrate 114, which is called an upper substrate or a color filter substrate, as a counter substrate facing the first substrate 112, a color filter pattern corresponding to each of the pixels and a black matrix enclosing the color filter pattern and covering a non-display element such as a gate line, a data line, and a thin film transistor may be formed.

In this case, as the liquid crystal display panel 110, all kinds of liquid crystal display panels may be used. For example, all types of liquid crystal display panels such as an IPS panel, an AH-IPS panel, a TN panel, a VA panel, and an ECB panel can be used. Here, in the case in which the IPS panel or the AH-IPS panel is used, a common electrode configured to form a transverse electric field with the pixel electrode may be formed on the first substrate 112.

In addition, an alignment film for determining an initial molecular alignment direction of a liquid crystal may be formed on an interface between the first and second substrates 112 and 114 and the liquid crystal layer. A seal pattern may be formed along edges of the substrates 112 and 114 to prevent leakage of the liquid crystal layer filled between the first and second substrates 112 and 114.

Furthermore, a polarizing plate for selectively transmitting specific polarized light may be attached to outer surfaces of the first and second substrates 112 and 114.

Moreover, a printed circuit board (PCB) may be connected along at least one edge of the liquid crystal display panel 110 via a connection member such as a flexible circuit board or a tape carrier package.

The backlight unit 120 may include a reflection plate 121, a light guide plate 200 disposed on the reflection plate 121, at least one optical sheet 125 disposed on the light guide plate 200, and first and second light emitting diode (LED) assemblies 130a and 130b disposed in correspondence with first and second light incidence surfaces E1 and E2, which are adjacent (i.e., neighboring) sides of the light guide plate 200, respectively.

The reflection plate 121 may have a white or silver color for reflective characteristics. The reflection plate 121 may be disposed below a back surface of the light guide plate 200, that is, a lower surface 201 of the light guide plate, and may act to reflect light passing through the lower surface 201 of the light guide plate toward the liquid crystal display panel 110, thereby improving the brightness.

In the light guide plate 200 located on the reflection plate 121, light incident on the light incidence surfaces E1 and E2 is uniformly spread over a wide area of the light guide plate 200 while the light travels several times through the light guide plate 200 by total reflection, and thus a uniform surface light may be emitted toward the liquid crystal display panel 110.

In particular, in this embodiment, a first prism pattern P1 functioning as a first light emitting pattern may be formed on the lower surface 201 of the light guide plate, and a second prism pattern P2 functioning as a second light emitting pattern may be formed on an upper surface 202 of the light guide plate. A viewing angle of the LCD 100 may be adjusted by controlling an emitting path of the backlight through the first and second prism patterns P1 and P2. The first and second prism patterns P1 and P2 will be described in more detail below.

At least one optical sheet 125 may be disposed on the upper surface 202 of the light guide plate 200. In this regard, in the case in which the optical sheet 125 is disposed in plural, for example, a diffusion sheet 125A that performs a diffusion function and a prism sheet 125B that performs a light condensing function may be used, but the present disclosure is not limited thereto.

The first LED assembly 130a positioned corresponding to the first light incidence surface E1 of the light guide plate 200 may include a plurality of first LEDs 131a and a first PCB 132a.

Here, the first PCB 132a may be formed to extend in a first direction D1, which is a longitudinal direction of the first light incidence surface E1. Moreover, the plurality of first LEDs 131a may be mounted on an upper surface of the first PCB 132a to be spaced apart from each other in the first direction D1.

The second LED assembly 130b positioned corresponding to the second light incidence surface E2, which is a second side surface, of the light guide plate 200 may include a plurality of second LEDs 131b and a second PCB 132b.

The second PCB 132b may extend in a second direction D2, which is a longitudinal direction of the second light incidence surface E2. Furthermore, the plurality of second LEDs 131b may be arranged on an upper surface of the second PCB 132b to be spaced apart from each other in the second direction D2.

At this time, in this embodiment, light emitting states of the plurality of first and second LEDs 131a and 131b may be controlled according to a viewing angle mode.

In this regard, for example, when the LCD 100 is driven in a narrow viewing angle mode, the plurality of first LEDs 131a may be turned on to emit light, and the plurality of second LEDs 131b may be turned off so as not to emit light.

In this case, since light emitted from the plurality of first LEDs 131a travels through the light guide plate 200 and is reflected by the first prism pattern P1 on the lower surface 201 of the light guide plate, which is a corresponding light emitting pattern, the light may be emitted in an upward vertical direction thereof, and thus the narrow viewing angle mode may be implemented.

Meanwhile, when the LCD 100 is driven in a wide viewing angle mode having a wide viewing angle, the plurality of second LEDs 131b may be turned on to emit light and the plurality of first LEDs 131a may be turned off to emit no light or may be turned on to emit light.

In this case, after the light emitted from the plurality of second LEDs 131b travels through the light guide plate 200 and is emitted to a downward vertical direction by the second prism pattern P2 on the upper surface 202 of the light guide plate, the light may be reflected by the reflection plate 121 and may travel upward, and thus the wide viewing angle mode may be implemented.

In this wide viewing angle mode, the plurality of first LEDs 131a configured to implement the narrow viewing angle may not substantially affect the driving of the wide viewing angle mode. When the plurality of first LEDs 131a are turned on, an amount of light emitted from the light guide plate 200 may increase to improve brightness.

Figure 3:
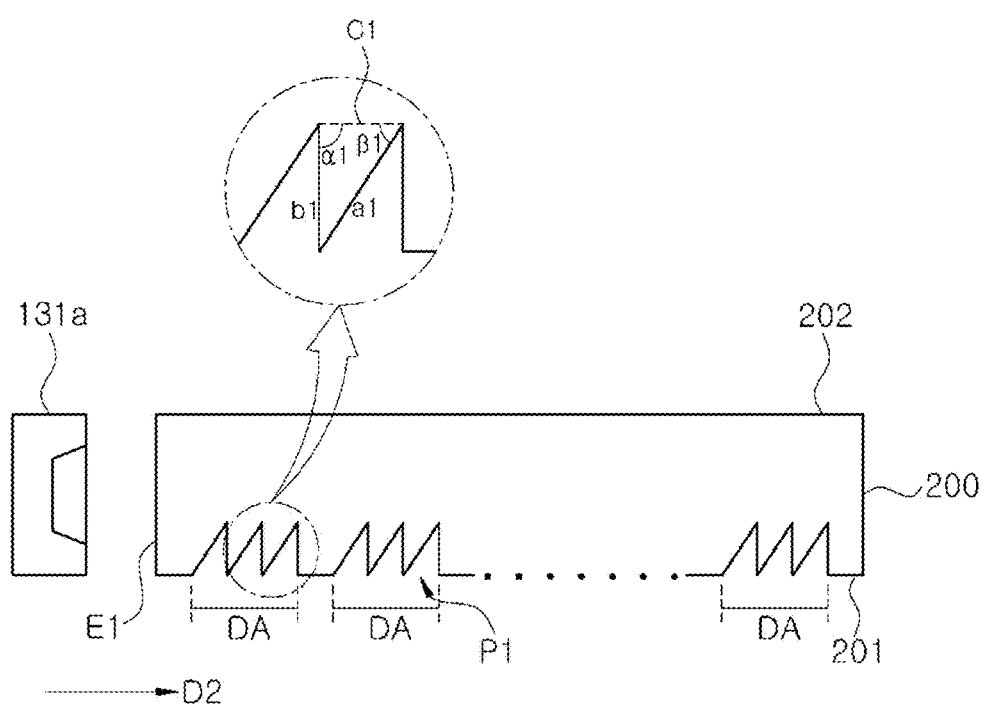
FIGS. 3 and 4 are cross-sectional views schematically illustrating first and second prism patterns according to an embodiment of the present disclosure, respectively.
Figure 4:
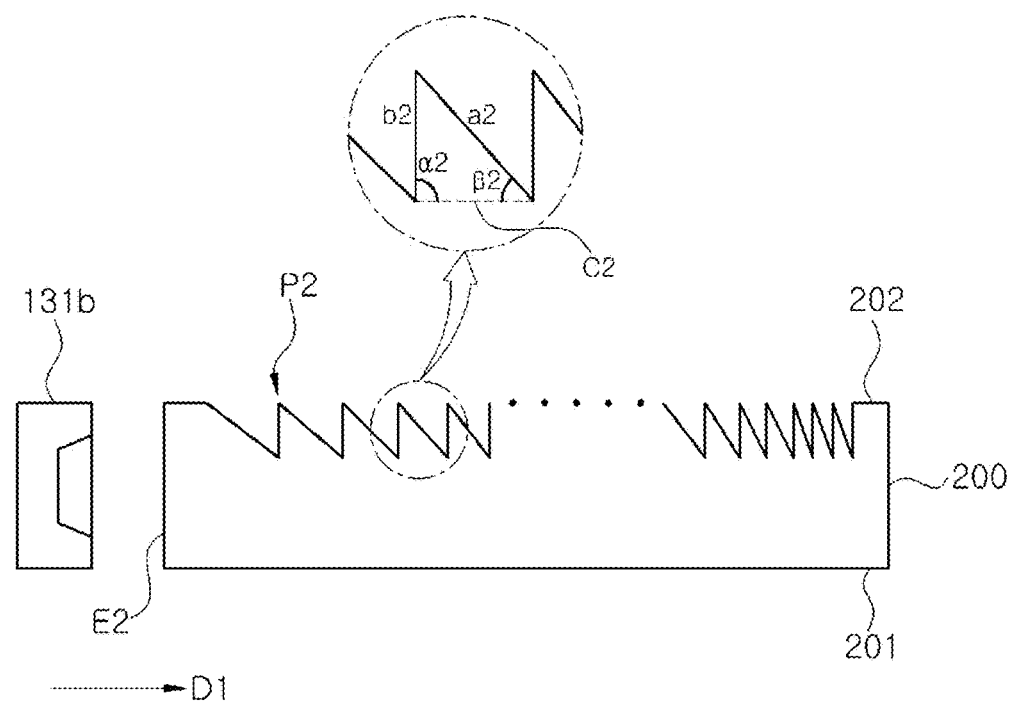

The first and second prism patterns P1 and P2 of the light guide plate 200, which is a structure for selectively implementing the narrow viewing angle and the wide viewing angle together with the plurality of first and second LEDs 131a and 131b, will be described with reference to FIGS. 3 and 4. FIGS. 3 and 4 are cross-sectional views schematically illustrating the first and second prism patterns according to an embodiment of the present disclosure, respectively.

The first prism pattern P1 may be configured such that an extending direction thereof is substantially parallel to an arrangement direction of the plurality of first LEDs 131a corresponding to the first direction D1, and the light emitted from the plurality of first LEDs 131a may act as a light emitting pattern.

Especially, the first prism pattern P1, which is defined by a base C1 (i.e., a first base C1) and first and second oblique sides a1 and b1 that extend outwardly from the base C1, may be composed of an asymmetric prism pattern in which two base angles $\alpha 1$ and $\beta 1$ at both ends of the first base C1 are different, that is, the first base angle $\alpha 1$ may be larger than the second base angle $\beta 1$. That is, the first and second sides a1 and b1 form two different base angles $\alpha 1$ and $\beta 1$ with respect to the base C1. In this case, it is preferable for the first base angle $\alpha 1$ to be configured to have an angle of about 80 to 90 degrees to secure a light propagation path in the vertical direction on the light guide plate 200. Moreover, it is preferable for the first oblique side a1, which is a side opposite the first base angle $\alpha 1$, to be located farther from the plurality of first LEDs 131a than the second oblique side b1, which is a side opposite the second base angle $\beta 1$. That is, it is preferable for the first base angle $\alpha 1$ to be located closer to the plurality of first LEDs 131a than the second base angle $\beta 1$.

As described above, by constituting the first prism pattern P1 on the lower surface 201 of the light guide plate, light emitted from the corresponding first LEDs 131a may be reflected by the first oblique side a1 of the first prism pattern P1 and emitted upward.

Furthermore, the first prism pattern P1 may be partially disposed on the lower surface 201 of the light guide plate. In this regard, for example, since dot areas DA as light emitting areas DA are arranged to be dispersed on the lower surface 201 of the light guide plate, the first prism pattern P1 may be formed in each of the dot areas DA.

As such, when the first prism pattern P1 is formed in a unit of the dot area DA, since the dot area DA having a small area functions as a light emitting unit area, light emitting pattern characteristic control of the light guide plate 200 may be more easily implemented.

In addition, to ensure uniformity of an emission distribution (or outgoing light distribution) through the first prism pattern P1, a density of the dot area DA may increase as the dot area DA recedes from the first light incidence surface E1 in a direction of the light incident surface thereof. Alternatively, a size (i.e., width or diameter) of the dot area DA may be configured to increase as the dot area DA recedes from the first light incidence surface in the direction of the light incident surface thereof. In other words, the dot area DA located adjacent to the first light incidence surface E1 may be made smaller in density and size than the dot area DA located farther away. In this regard, FIG. 2 illustrates an example in which the density of the dot area DA increases as a distance from the first light incidence surface E1 in the direction of the light incident surface increases.

Next, the second prism pattern P2 may be configured such that its extension direction is substantially parallel to an arrangement direction of the plurality of second LEDs 131b corresponding thereto, and the second prism pattern P2 may act as a light emitting pattern for light emitted from the plurality of second LEDs 131b.

In particular, the second prism pattern P2 defined by a base C2 (i.e., a second base C2) and third and fourth oblique sides a2 and b2 that extend outwardly from the base C2, as both sides thereof, may be similar to the first prism pattern P1. Asymmetric prism patterns may be formed in which two base angles $\alpha 2$ and $\beta 2$ at both ends of the second base C2 are different. That is, the third and fourth sides a2 and b2 form two different base angles $\alpha 2$ and $\beta 2$ with respect to the base C2. That is, the third base angle $\alpha 2$ is configured to be larger than the fourth base angle $\beta 2$. In this case, it is preferable for the third base angle $\alpha 2$ to be configured to have an angle of about 80 to 90 degrees to secure a light propagation path in the vertical direction under the light guide plate 200. In addition, it is preferable for the third oblique side a2, which is a side opposite the third base angle $\alpha 2$, to be located farther from the plurality of second LEDs 131b than the fourth oblique side b2, which is a side opposite the fourth base angle $\beta 2$. That is, it is preferable for the third base angle $\alpha 2$ to be located closer to the plurality of second LEDs 131b than the fourth base angle $\beta 2$.

As described above, by constituting the second prism pattern P2 on the upper surface 202 of the light guide plate, light emitted from the corresponding second LED 131b may be reflected by the third oblique side a2 of the second prism pattern P2 and emitted downward. At this time, light emitted downward may be reflected by the reflection plate 121 in a Lambertian distribution to proceed in an upward direction.

Furthermore, in the wide viewing angle mode, it is preferable for the second prism pattern P2 to be formed substantially on the entire upper surface 202 of the light guide plate to increase light emitting efficiency thereof.

In addition, as shown in FIGS. 1 and 4, in order to ensure uniformity of a light emission distribution through the second prism pattern P2, the second prism pattern P2 may be configured to increase a density (i.e., the distance) thereof as a distance from the second light incidence surface E2 in a direction of the light incident surface increases. In other words, the second prism pattern P2 located close to the second light incidence surface E2 may be configured to have a smaller density than the second prism pattern P2 located farther away.

Figure 5:
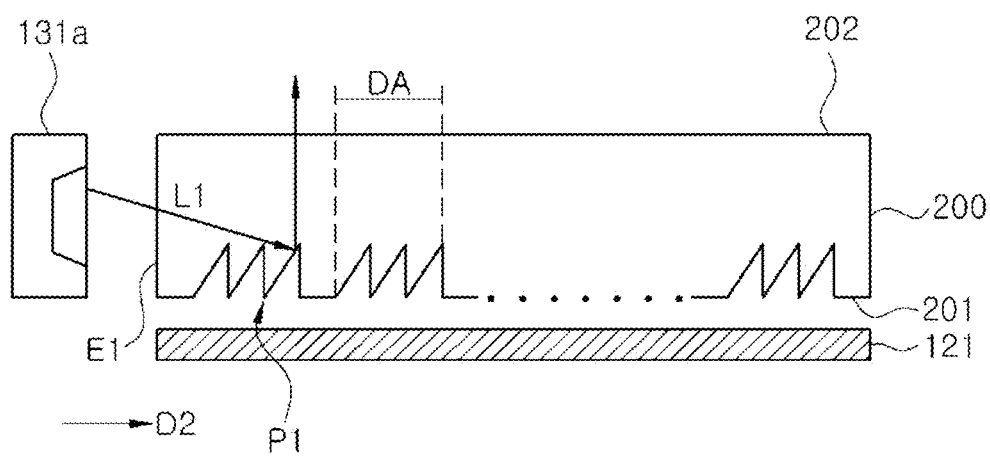
FIG. 5 is a view schematically illustrating an LCD driven in a narrow viewing angle mode according to an embodiment of the present disclosure.
Figure 6:
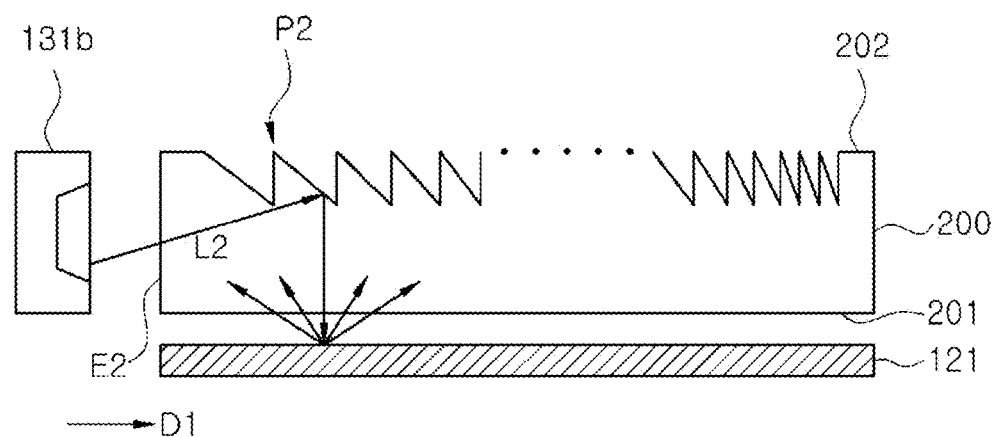
FIG. 6 is a view schematically illustrating an LCD driven in a wide viewing angle mode according to an embodiment of the present disclosure.

Hereinafter, narrow viewing angle mode driving and wide viewing angle mode driving according to an embodiment of the present disclosure will be described with reference to FIGS. 5 and 6. FIG. 5 is a view schematically illustrating an LCD driven in the narrow viewing angle mode according to an embodiment of the present disclosure. In addition, FIG. 5 is a cross-sectional view taken in a second direction perpendicular to an extending direction of a first prism pattern for implementing the narrow viewing angle mode. Furthermore, FIG. 6 is a view schematically illustrating an LCD driven in the wide viewing angle mode according to an embodiment of the present disclosure. In addition, FIG. 6 is a cross-sectional view taken in a first direction perpendicular to the extending direction of the second prism pattern for implementing the wide viewing angle mode.

Firstly, when the LCD 100 is driven in the narrow viewing angle mode, the plurality of first LEDs 131*a* may be turned on, and the plurality of second LEDs 131*b* may be turned off.

In this case, first light L1 emitted from the plurality of first LEDs 131*a* is incident on the light guide plate 200 through the first light incidence surface E1 facing the light guide plate 200 and travels the inside of the light guide plate 200. The first light L1 may be reflected by the first prism pattern P1 extending in a direction perpendicular to a traveling direction of the first prism pattern P1 to be emitted in the upward vertical direction.

As such, most of the backlight emitted by the first prism pattern P1 may be vertically incident on the liquid crystal display panel 110, and thus the narrow viewing angle mode may be effectively implemented.

Meanwhile, in this narrow viewing angle mode, since the second prism pattern P2 is substantially parallel with the traveling direction of the first light L1, which is incident from the plurality of first LEDs 131*a*, the second prism pattern P2 may function as a light guide pattern instead of functioning substantially as a light emitting pattern for the first light L1. Accordingly, the second prism pattern P2 may not substantially affect the driving of the narrow viewing angle mode.

Next, when the LCD 100 is driven in the wide viewing angle mode, the plurality of second LEDs 131*b* may be turned on, and the plurality of first LEDs 131*a* may be turned off or may be turned on.

In this case, second light L2 emitted from the plurality of second LEDs 131*b* may be incident on the light guide plate 200 through the second light incidence surface E2 facing the light guide plate 200, and travel the inside of the light guide plate 200. The second light L2 may be reflected to be emitted in the downward vertical direction by the second prism pattern P2 extending in a direction perpendicular to a traveling direction of the second light L2.

The second light L2 emitted downward may be reflected by the reflection plate 121 to travel upward again. As the reflection plate 121 reflects light in the form of a Lambertian distribution at the time of reflection, the light distribution may be dispersed in a lateral direction to proceed toward an upper portion of the LCD display device 100.

Accordingly, the backlight emitted by the second prism pattern P2 may be incident on the liquid crystal display panel 110 and have a light distribution in the lateral direction in addition to the vertical direction, and thus the wide viewing angle mode may be effectively implemented.

Meanwhile, in this wide viewing angle mode, since the first prism pattern P1 is substantially parallel to the traveling direction of the second light L2 incident thereon from the plurality of second LEDs 131*b*, the first prism pattern P1 may function as a light-guiding pattern instead of functioning as a light emitting pattern for the second light L2, and thus the first prism pattern P1 may not substantially affect the driving of the wide viewing angle mode.

In addition, in the wide viewing angle mode, when the plurality of first LEDs 131*a* are driven in an ON state, the light emitted from the plurality of first LEDs 131*a* may be emitted by the first prism pattern P1, and thus brightness may be improved in the wide viewing angle mode.

Figure 7:
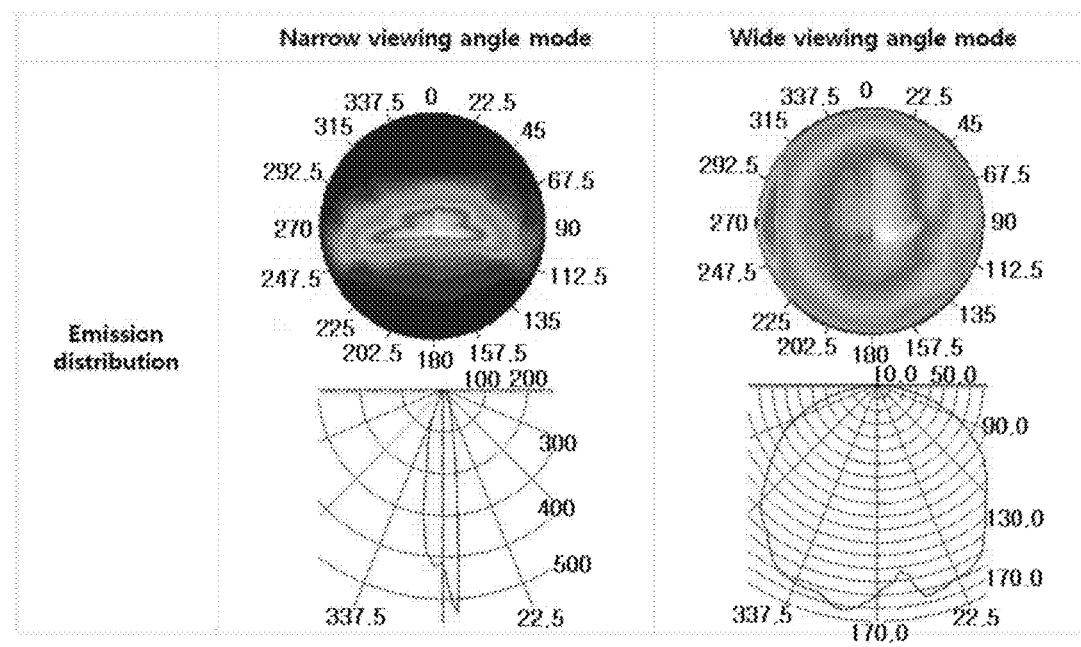
FIG. 7 is a diagram showing experimental results of the narrow viewing angle mode and the wide viewing angle mode according to the present embodiment.

Referring to FIG. 7 illustrating results of an experiment of the narrow viewing angle mode and the wide viewing angle mode according to an embodiment of the present disclosure, it may be seen that a narrow viewing angle and a wide viewing angle are effectively implemented.

Meanwhile, each of the first and second prism patterns P1 and P2 according to an embodiment of the present disclosure may be formed in an engraved shape or embossed shape.

In this regard, FIGS. 1 to 6 illustrate examples when the first and second prism patterns P1 and P2 are formed in an engraved shape.

Figure 8:
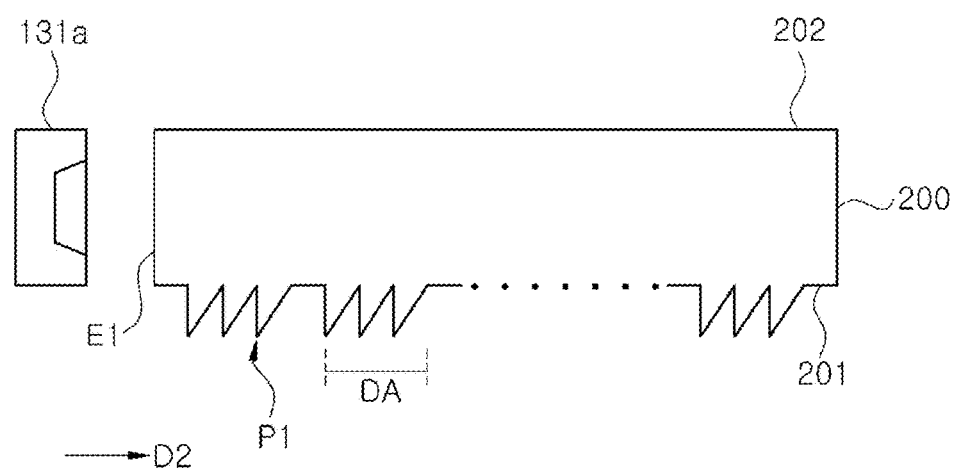
FIGS. 8 and 9 are cross-sectional views illustrating an example in which each of first and second prism patterns are formed in an embossed shape according to an embodiment of the present disclosure.
Figure 9:
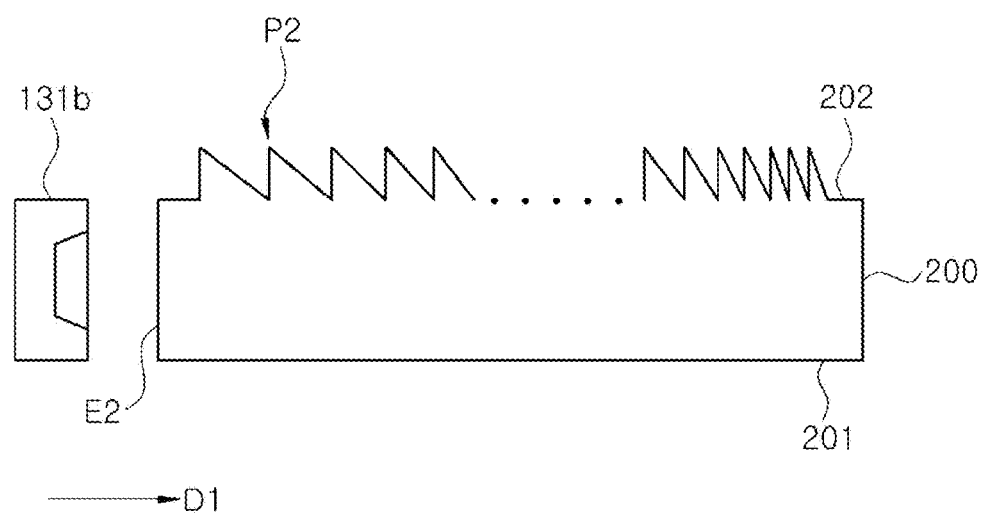

As another example, FIGS. 8 and 9 illustrate examples when the first and second prism patterns P1 and P2 are formed in an embossed shape.

As such, each of the first and second prism patterns P1 and P2 formed on the light guide plate 200 may be embodied in both an engraved shape and an embossed shape.

As described above, according to an embodiment of the present disclosure, the first prism pattern, which is a light emitting pattern configured to realize a narrow view angle, may be formed on the lower surface of the light guide plate, and the second prism pattern for realizing a wide viewing angle may be formed on the top surface of the light guide plate. Accordingly, a first LED corresponding to the first prism pattern may be driven to be in an ON state when being driven in the narrow viewing angle mode, and a second LED corresponding to the second prism pattern may be driven in an ON state when being driven in the wide viewing angle mode.

Accordingly, it is possible to selectively implement a narrow viewing angle and a wide viewing angle without separately configuring a viewing angle adjusting component in a backlight, thereby improving transmittance, luminance, and image quality degradation, improving power consumption, and reducing a component cost. Therefore, viewing angle control may be effectively implemented without increasing cost and deteriorating backlight characteristics.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A liquid crystal display device, comprising:
   a liquid crystal display panel;
   a reflection plate;
   a light guide plate between the liquid crystal display panel and the reflection plate, the light guide plate having adjacent first and second light incidence surfaces; and
   first and second light-emitting diodes (LEDs) facing the first and second light incidence surfaces, respectively, wherein the light guide plate comprises:
      a first prism pattern on a lower surface of the light guide plate and extending in a first direction parallel to the first light incidence surface; and
      a second prism pattern on an upper surface of the light guide plate and extending in a second direction parallel to the second light incidence surface,
   wherein, in a narrow viewing angle mode, the first LED is in an ON state and the second LED is in an OFF state.

2. The liquid crystal display device of claim 1, wherein the light guide plate includes a plurality of dot areas dispersed and arranged on the lower surface of the light guide plate are defined, and the first prism pattern is formed on each of the dot areas.

3. The liquid crystal display device of claim 1, wherein each of the first and second prism patterns includes respective base portions and respective first and second sides that extend outwardly from the base portions, and the first and second sides form two different base angles with respect to the base portion.

4. The liquid crystal display device of claim 1, wherein each of the first and second prism patterns is formed in an engraved shape or embossed shape.

5. The liquid crystal display device of claim 2, wherein the dot areas have an increasing size or density as a distance of the dot areas from the first light incidence surface increases.

6. The liquid crystal display device of claim 1, wherein the second prism pattern has an increasing density as a distance from the second light incidence surface increases.

7. The liquid crystal display device of claim 1, wherein, in a wide viewing angle mode, the second LED is in an ON state and the first LED is in an OFF state or an ON state.

8. A liquid crystal display device, comprising:
   a liquid crystal display panel;
   a reflection plate;
   a light guide plate between the liquid crystal display panel and the reflection plate, the light guide plate having adjacent first and second light incidence surfaces; and
   first and second light-emitting diodes (LEDs) facing the first and second light incidence surfaces, respectively, wherein the light guide plate comprises:
      a first prism pattern on a lower surface of the light guide plate and extending in a first direction parallel to the first light incidence surface; and
      a second prism pattern on an upper surface of the light guide plate and extending in a second direction parallel to the second light incidence surface,
   wherein, in a wide viewing angle mode, the second LED is in an ON state and the first LED is in an OFF state or an ON state.

9. The liquid crystal display device of claim 8, wherein the light guide plate includes a plurality of dot areas dispersed and arranged on the lower surface of the light guide plate are defined, and the first prism pattern is formed on each of the dot areas.

10. The liquid crystal display device of claim 8, wherein each of the first and second prism patterns includes respective base portions and respective first and second sides that extend outwardly from the base portions, and the first and second sides form two different base angles with respect to the base portion.

11. The liquid crystal display device of claim 8, wherein each of the first and second prism patterns is formed in an engraved shape or embossed shape.

12. The liquid crystal display device of claim 9, wherein the dot areas have an increasing size or density as a distance of the dot areas from the first light incidence surface increases.

13. The liquid crystal display device of claim 8, wherein the second prism pattern has an increasing density as a distance from the second light incidence surface increases.

* * * * *